United States Patent [19]

Juganson et al.

[11] 4,005,741
[45] Feb. 1, 1977

[54] METHOD FOR THE FABRICATION OF TUBE PRODUCTS

[76] Inventors: Elmar Juganovich Juganson, prospekt Lenina, 40, kv. 32; Isaak Yakovlevich Chernyavsky, ulitsa Vorovskogo, 41, kv. 10; Vladimir Yakovlevich Ivantsov, prospekt Lenina, 62, kv. 2; Jury Ivanovich Blinov, ulitsa Tsvillinga, 31, kv. 43; Vladimir Petrovich Ustyantsev, ulitsa Vagnera, 71, kv. 112; Igor Alexeevich Klestov, ulitsa Soni Krivoi, 37, kv. 2, all of Chelyabinsk, U.S.S.R.

[22] Filed: Mar. 5, 1975

[21] Appl. No.: 555,616

[52] U.S. Cl. .................................. 164/54; 164/114
[51] Int. Cl.² .......................................... B22D 23/00
[58] Field of Search .............. 164/53, 54, 96, 114

[56] References Cited

UNITED STATES PATENTS 1,982,762  12/1934  Russell et al. ............... 164/114 X
3,324,933  6/1967  Shewmon ...................... 164/114

FOREIGN PATENTS OR APPLICATIONS 536,402  4/1955  Canada .......................... 164/53
367,361  2/1932  United Kingdom ............. 164/54
393,470  6/1933  United Kingdom ............. 164/53

Primary Examiner—Richard B. Lazarus
Assistant Examiner—John E. Roethel

[57] ABSTRACT

A method characterized in that the material for a tube product is a Thermit mixture in powder form incorporating at least one metal oxide and its reducer, wherein the mixture is ignited while a cylindrical part is set spinning, which is continued until a liquid melt of the mixture is separated into a metal layer and a layer of corundum which eventually crystallize so that a twin-layer tube product is formed. The invention suggests a number of additional, optional method steps.

13 Claims, 7 Drawing Figures

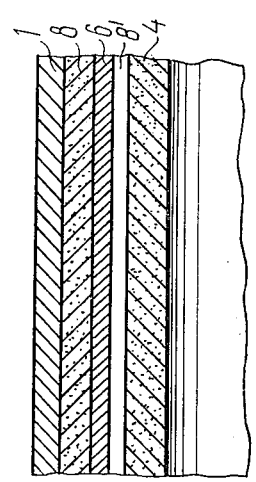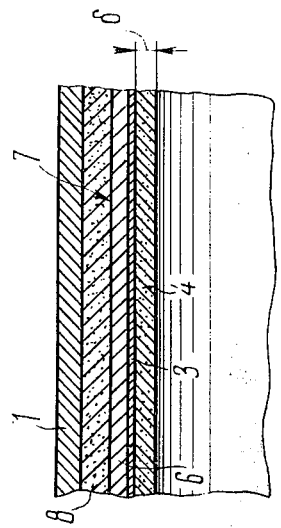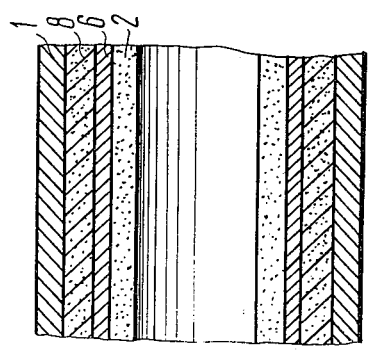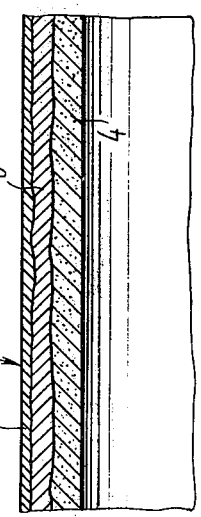

METHOD FOR THE FABRICATION OF TUBE PRODUCTS

The present invention relates to an improvement in a method for the fabrication of tube products. The term tube products as used hereinunder denotes both tubes and coating applied thereto.

The invention disclosed may be used to advantage in the fabrication of tubes of refractory materials used for the pneumatic or hydraulic conveying of particulate abrasive materials, such as, for example, sand, gravel, blast-furnace slag, cement, coal and ore concentrate of any composition.

In addition, the invention may find application in the manufacture of tubes for thermal plant where aggressive high-temperature mixtures of liquids with particulate components are conveyed over a network of piping. Since the working layer of the tubes displays heat conductivity of relatively low order, said tubes are suitable also for carrying liquid metal over considerable distance without substantial cooling of the metal.

At present, much difficulty is experienced in producing tubing whose inner surface is capable of withstanding intensive abrasive wear by particulate material exhibiting high abrading effect and hardness.

Well known in the art is a method for the fabrication of tube products wherein a hollow cylindrical part is set spinning centrifugally in a horizontal position and simultaneously introduced into its bore is a material for tube product which distributes over the internal surface of the cylindrical part in a uniform layer during the operation of spinning. Produced by said method are cast iron tubes coated with a silicate melt from the inside before removing these tubes from the chills; ths enables the production of twin-layer tubes.

The tubes produced by the known method are heat treated with the purpose of improving the crystalline structure of the silicate layer and, consequently, the quality of said layer. Said method involves the use of high-capacity furnaces wherein the metal and silicate material are melted separately, also means of handling the molten metal and silicate are also indispensable so that the process of fabricating tubes becomes a complicated one.

The quality of internal silicate layer depends on a number of factors which are sometimes beyond control as is the case with the temperature of the melt applied, for difficulties are experienced in maintaining it at a constant level both over the length and circumference of the tube. To avoid any consequent reduction in the wear resistance and strength of the lining beyond the limits specified for normal operation, the silicate-coated metal tubes are made with the silicate coating as thick as 25 mm at a side. This adds to the weight of tubes and poses problems in joining the tubes and laying pipelines. Particularly difficult is the fabrication of tubes in lengths varying between 2 and 2.5 m because the problem of maintaining at a constant level the temperature of the silicate melt applied to the inside of metal tube is a formidable task.

A rising demand for wear-resistant tubes adapted for the hydraulic conveying of particulate material has posed the problem of developing a more productive method of fabricating such tubes.

It is an object of the present invention to provide a method for the fabrication of tube products with an inner surface capable of withstanding intensive abrasive wear by the material conveyed over said products and exhibiting a high abrading effect.

Another object of the present invention is to provide a method for the fabrication of tube products with an inner surface capable of withstanding intensive abrasive wear by the material conveyed over said product and exhibiting a high hardness, $\mu$ H, which varies over the range between 1200 and 2000 kg/mm$^2$.

These and other objects are attained by the inventive method for the fabrication of tube products, entailing centrifugal spinning of a hollow cylindrical part in a horizontal plane with simultaneous introduction into its bore of a material for tube product in powder form which distributes over the inside surface of the cylindrical part in a uniform layer while the spinning is carried on.

According to the invention the material is a Thermit mixture in powder form incorporating at least one metal oxide and its reducer; the material is ignited during the spinning step and the latter is continued until a liquid melt of mixture is separated into a layer of metal and layers corundum which eventually crystallize so that twin-layer tube product is obtained.

To obtain a wear-resistant coating on the inside surface of a metal tube disposed in a spinning cylindrical part, the Thermit mixture is introduced into the metal tube, on which inside surface the Thermit mixture, a metal and a corundum layer, are obtained during the spinning and melting steps which layers form a twin-layer wear-resistant coating.

The method of fabricating products with an internal monolithic corundum coating, using or omitting metal blanks, enables the manufacture of tube products of a cylindrical shape, characterized by a number of advantages and, before all, by a high abrasive resistance which makes pneumatic or hydraulic conveying of particulate material a practical possibility, with high abrading effect and hardness. The tube products may find application in a variety of thermal plant as working components of their structures, in conveying liquid and solid aggressive media at high temperatures, and as heat insulators.

The inventive method has the advantage over the known methods of fabricating non-abrading tubes with non-metallic working coating in that it dispenses with liquid source materials, liquid corundum in particular. In the method disclosed, corundum is obtained by using directly a Thermit powdered mixture which separates into a layer of metal and a layer of monocorundum in the course of burning and centrifugation, making thus redundant all the power-consuming and bulky equipment, along with means of delivering liquid metal and corundum to the place where tubes are being made.

In embodying the method, it is expedient, preparatory to introducing the Thermit mixture, to place a heat-absorbing powdered material into the cylindrical part so that the material distributes over the inside surface of the part in a uniform layer when the part is being spun, and it protects same from being melted by the liquid Thermit melt.

The high temperature (between 2800 and 3000° C) at which the process takes place calls for a reliable insulation, preventing direct contact of the cylindrical part with the products of the decomposing Thermit mixture.

As far as the heat-absorbing material is concerned, preference is given to powdered corundum alumina which, exhibiting a high melting point (2100° C) and a low heat conductivity, creates favourable conditions for the forming of liquid products into a tube article. The heat-absorbing powdered material can be placed in a layer at least as thick as the layer of corundum which results from the burning of the Thermit mixture. The thickness of layer so selected assures the best absorption of surplus heat liberated by the melting Thermit mixture whereas the heat-absorbing material melts only partly at the surface in contact with the Thermit melt.

The Thermit mixture may contain ferrous-ferric oxide as the metal oxide and aluminium as the reducer of the oxide. The metal oxide selected is characterized by the availability of oxygen in a maximum amount which intensifies the process of Thermit burning. Aluminum, in turn, displays high affinity for oxygen and serves as a good reducer of ferrous-ferric oxide.

The Thermit mixture may also contain a mixture of ferrous-ferric oxide with manganese oxide as the metal oxide and an aluminium-magnesium alloy as their reducer. The oxides are available in abundance, being an industrial waste as the scale formed during the hot rolling of metals, and their utilization is a desirable factor. Metal reducers are also met with in engineering on a large scale, particularly in producing a variety of iron-base alloys, and are a material which can be regarded as the most suitable one for developing the industry of fabricating tube products with an internal coat of monocorundum.

Preparatory to introducing the Thermit mixture, it is expedient to place a heat-absorbing powdered material on the inside and outside surfaces of the metal tube contained in the spinning cylindrical part, the maximum weight ratio of the material placed on the inside surface of tube to the Thermit mixture used being 1:10.

The heat-absorbing material placed on the inside surface of the tube in accordance with the ratio lowers the temperature of the Thermit melt in contact with the inside surface of tube. Furthermore, the heat-absorbing material improves the mechanical properties of the monocorundum layer, this improvement being attained due to the mixing of the molten layer of heat-absorbing powder with the molten layer of the monocorundum formed.

At the outside surface of the tube, it is preferred to place powdered corundum which minimizes the amount of heat removed from the layer of corundum formed in the tube, and extends thereby the period during which the corundum remains in the liquid state. This facilitates a more complete liberation of gases from the Thermit melt and causes the components with a lower specific gravity to rise to the surface of the monocorundum layer.

In selecting the heat-absorbing powdered material placed on the inside surface of tube, preference is given to a 1:1 mixture of quartz sand with blast-furnace slag. The mixture has a melting point which is lower than that of the corundum melt, intermixes intensively with the liquid corundum base at the temperature of exothermic reation and imparts increased mechanical strength and thermal resistance to the corundum after the crystallization, with a simultaneous absorbtion of surplus heat needed for its melting.

The present invention will be best understood from the following examples of a preferred embodiment when these examples are read in conjunction with the accompanying drawings wherein FIG. 1 is a schematic longitudinal sectional elevation illustrating the way a heat-absorbing powdered material and a Thermit mixture are disposed on the inside surface of a spinning cylindrical part, in accordance with the invention;

FIG. 4 is a longitudinal elevation of a metal tube with the Thermit mixture applied to its inside surface, according to the invention;

FIG. 5 is a longitudinal elevation of a metal tube with a wear-resistant coating produced after the exothermic reaction of the Thermit mixture, in accordance with the invention;

FIG. 6 is a schematic longitudinal elevation illustrating the way a metal tube and a heat-absorbing material are disposed in the bore of the spinning cylindrical part, and also the way a layer of the Thermit mixture is arranged on the inside layer of the heat-absorbing material, according to the invention; and FIG. 7 is a schematic longitudinal elevation illustrating the way the products of the exothermic reaction of the Thermit mixture, i.e., the layers of metal and corundum, produced during the process of centrifugation, are disposed on the inside surface of metal tube.

Figure 1:
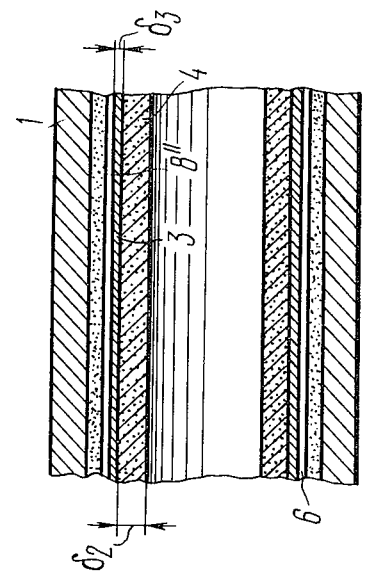
Figure 2:
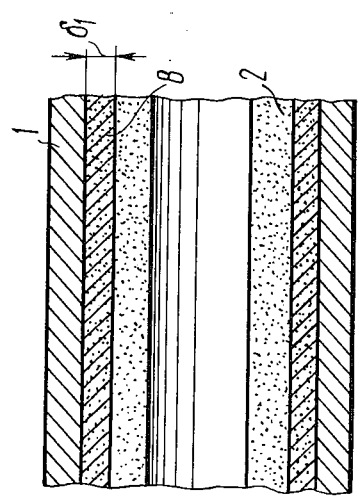
FIG. 2 is a schematic longitudinal elevation illustrating the way layers of metal and corundum, formed due to the separation of the Thermit mixture in the course of the spinning of the cylindrical part and the burning of the Thermit mixture, are disposed on the inside surface of the spinning cylindrical part, according to the invention.

The essence of the disclosed method for the fabrication of tube products is as follows. A hollow cylindrical part 1 (FIGS. 1, 2, 4, 6 and 7), which may be a chill of a centrifugal casting machine for example, is set spinning in a horizontal plane. As the chill is spinning, a material for the tube product is introduced into its bore. Used as the material, in accordance with the invention, is a Thermit mixture 2 (Figs. 2, 4 and 6) which incorporates at least one metal oxide and its reducer.

Figure 3:
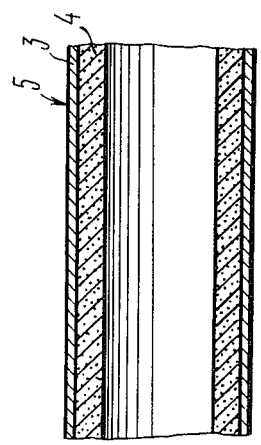
FIG. 3 is a longitudinal elevation of a portion of the twin-layer tube product obtained.

While the spinning of the chill goes on, the Thermit mixture 2 introduced into its bore is ignited so as to burn, and the spinning is continued until the liquid melt of the Thermit mixture 2 is separated into a metal layer 3 (FIGS. 2 and 3) and a corundum layer 4, which distribute uniformly one above another over the inside surface of the chill. The two layers 3 and 4 formed eventually crystallize so that a twin-layer tube product 5 is obtained (FIG. 3).

Proceeding in the same way, one can apply a wear-resistant coating to the inside surface of a metal tube. To that end, a metal tube 6 (FIGS. 4, 5, 6 and 7) is placed inside the hollow cylindrical part 1, the chill, which is then set spinning about its horizontal axis. During the process of spinning, introduced into the bore of the tube 6 is according to the invention a Thermit mixture 2 which is then ignited. The spinning goes on until the liquid melt of the Thermit mixture 2 is separated into the metal layer 3 and the corundum layer 4 which crystallize eventually. As a result, the metal tube 6 is coated from the inside with a twin-layer wear-resistant coating (FIG. 5).

The exothermic reaction of the Thermit mixture is accompanied by a rise in the temperature to between 2800° and 3000° C, and for this reason there is need to provide a reliable insulation for the surfaces of both the cylindrical part and the metal tube, protecting these from the direct action of the Thermit melt. Serving this purpose is a heat-absorbing powdered material 8 (FIGS. 1, 2 and 6) which commonly is powdered corundum. This heat-absorbing powdered material is taken in an amount which assures that its thickness $\delta_1$ (FIG. 1), obtained during the process of spinning, is at least equal to the thickness $\delta_2$ (FIG. 2) of the layer of corundum formed due to the spinning of the chill 1 and the burning of the Thermit mixture 2.

The Thermit mixture may contain ferrous-ferric oxide or a mixture of ferrous-ferric oxide with manganese oxide as the metal oxide, and aluminium or an aluminum-magnesium alloy as the reducer, respectively.

If the method disclosed is employed for the fabrication of wear-resistant tubes lined with corundum, the heat-absorbing powdered material 8 (powdered electrocorundum) is introduced into the bore of the spinning part (chill) 1 (FIG. 1), and then the Thermit mixture 2 containing ferrous-ferric oxide and aluminium. The electrocorundum powder is taken in an amount that the thickness $\delta_1$ of its layer is at least equal to the thickness $\delta_2$ of the layer of corundum 4 (FIG. 2) obtained due to the exothermic reaction of the Thermit mixture 2 and the spinning of the chill 1.

When the chill 1 is set spinning, the centrifugal forces causes the Thermit mixture 2 to distribute over its inside surface in a uniform layer. The Thermit mixture 2 is ignited by any known means, particularly with drops of liquid metal from an arc-melted electrode. The drops of liquid metal contacting the latter mixture 2 rapidly heat the Thermit where contacted, to the melting point of the oxide ($Fe_2O_3$). The contact of the liquid oxides with the reducer (AL) brings about the melting of the Thermit mixture 2 over the entire inside surface of the chill 1 almost at the same time.

During the reactions of reduction taking place in the layer of the Thermit mixture 2 at this stage, the liberated heat transforms the components of the mixture into the liquid state, and consequently a two-component liquid melt is formed, consisting of the metal of the oxide reduced, Fe, and the oxide of the reducer metal, $Al_2O_3$, i.e., corundum.

Exposed to the effect of spinning, the melt separates into the metal layer 3 (FIG. 2) which is of the thickness $\delta_3$ and is continuous to a heat-absorbing layer 8 inches, this layer being melted or sintered either partly or completely (white slip in the Fig.) so as to prevent the inside surface of the chill 1 from the direct action of the overheated products of Thermit decomposition, and into the corundum layer 4 with the thickness $\delta_2$, overspreading the metal layer 3.

The spinning of the chill 1, with the liquid Thermit melt separated into two layers, goes on as long as this is required until the liquid products of the exothermic reaction are completely crystallized. Thus there is formed on the inside surface of the chill 1 the twin-layer cermet tube product 5 illustrated in FIG. 3 with the inside corundum layer 4. After the crystallization of layers the tube product 5 is removed from the chill 1 and allowed to cool.

When a wear-resistant coating is to be applied to the inside surface of the metal tube 6 (FIG. 4), disposed in the spinning cylindrical part 1 (chill), the heat-absorbing material 8 is also to be used, being placed between the inside surface of the chill 1 and the outside surface of the metal tube 6. The Thermit mixture 2 is placed into the bore of the metal tube 6 in an amount decided by the ratio between the weight of the tube strengthened and that of the Thermit, this ratio being at least 1:2.

The layer of the corundum powder 8 (FIGS. 2, 4 and 5), placed between the inside surface of the chill 1 and the outside surface of the metal tube 6, prevents the welding of the metal tube 6 to the inside walls of the chill 1, should the Thermit melt burn through the tube 6. The Thermit mixture 2 is ignited by drops of liquid metal in the same way as indicated above.

Exposed to spinning, the liquid Thermit melt is separated, as illustrated in FIG. 5, into the metal layer 3 contiguous to the inside surface of the tube 6 and the monolithic corundum layer 4 which form the wear-resistant coating inside the tube 6. The heat-absorbing powdered material placed between the inside surface of the chill 1 and the outside surface of the metal tube 6 is preferably powdered electrocorundum 8.

It is recommended that the Themit mixture incorporates iron oxides ($Fe_2O_3$) and that use is made of aluminium (Al) as the reducer of the oxide. The exothermic process may also be carried out with the aid of multi-component mixtures of metal oxides in conjunction with a mixture of metals reducing the oxides, as for example $F_2O_3$ + MnO with powdered alloys of Al and Mg.

To minimize the intensity of heating of the metal tube 6 (FIG. 6) disposed in the bore of the cylindrical part 1, a heat-absorbing powdered material 8 is applied to the outside surface of the metal tube 6 before introducing the Thermit mixture 2. The maximum ratio between the weight of the heat-absorbing material 8', distributed over the inside surface of the tube 6 in a uniform layer during the process of spinning, and the weight of the Thermit mixture is 1:10.

It is expedient to use as the heat-absorbing material 8' a 1:1 mixture of quartz sand and blast-furnace slag. Under the influence of the centrifugal spinning of the chill 1, integrally with the metal tube 6 disposed in the bore of the chill, the liquid Thermit melt separates into two layers, the metal layer 3 contiguous to the surface of the tube 6, and the monocorundum layer 4 contiguous to the metal layer 3 formed on the surface of the tube 6 (FIG. 5). Melted by the burning Thermit melt, the heat-absorbing layer of powdered corundum 8' (FIG. 6) is transformed into the corundum layer 4 (FIG. 7), adding to its thickness and improving the mechanical properties.

EXAMPLE 1

A wear-resistant tube was fabricated without using a tube blank. The relevant procedure was as follows.

Powdered corundum with a particle size of 0.5 mm was placed on the inside surface of a thick-walled chill 1 m long and with a bore of 3000 mm in diameter so as to form a layer between 10 and 12 mm thick. The application of powdered corundum was accomplished with the aid of a 1000 mm long slit-type feeder (not shown) placed into the bore of the chill and rotated about the horizontal axis in the direction opposite to that of the chill. This enables the formation of a uniform layer of powdered electrocorundum all the way around the circumference.

A layer of powdered corundum of a more uniform thickness could be obtained by employing various other contrivances used in founding, for the application of the heat-insulating layer of sand to the inside of chills, preparatory to the centrifugal casting of metals.

Applied on top of the 10 to 12-mm layer of powdered corundum, using the same contrivance, was a Thermit mixture comprising ferrous-ferric oxide ($Fe_2O_3$) and aluminium powder (Al) taken in stoichiometric amounts. The amount of Thermit mixture used was 10 times that by weight of the electrocorundum applied into the chill.

On setting the chill to spin centrifugally at a speed between 650 and 700 rpm, the Thermit mixture was ignited by drops of liquid metal, and in some 20 to 25 sec. the entire Thermit contained in the chill was on fire. The spinning of the chill with the molten Thermit was stopped in some 250 sec, the tube product removed from the chill in hot condition and allowed to cool.

In this way the twin-layer tube was produced, with the layer of metal on the outside and the layer of monocorundum on the inside. The thickness of the metal layer was 8 or 9 mm and that of the monocorundum between 18 and 20 mm. The machine time of fabricating the 1m long tube with a diameter of 350 mm was 275 to 280 sec.

EXAMPLE 2

A wear-resistant tube was fabricated with the use of a tube blank in the following way.

Disposed in a heavy metallic chill with a bore 200 mm in diameter and 500 mm long was a tube blank measuring 159 mm in length and with a wall thickness of 4.5 mm. The tube blank was insulated from the wall of the chill by a 20-mm layer of powdered electrocorundum and fixed with respect to the axis of chill by means of the chill end plates.

Upon setting the chill to spin centrifugally, integrally with the blank, a layer of powdered Thermit was introduced into the bore of the blank, comprising a mixture of oxides of iron and manganese in conjunction with a powdered aluminum-magnesium alloy used as the reducer of the oxides.

The Thermit was ignited in the usual way, by drops of liquid metal formed during the arc-melting of a metal electrode, when the spinning speed of the chill reached 500 rpm. The weight of the Thermit introduced into the tube was twice the weight of the tube blank. In 3.5–4 sec. the entire Thermit in the tube bore was on fire and the period of burning lasted 20 sec.

The spinning of the chill with the tube went on until the product of the Thermit reaction had fully crystallized and took 2.5 min. The chill was stopped, the tube given a cermet coat from the inside, removed from the chill, and allowed to cool down. The quality of surface finish was close to that obtained after grinding. The metal layer was 3 or 4 mm thick and the thickness of the monocorundum layer varied between 10 and 12 mm. The machine time of fabricating a tube 500 mm long and with a diameter of 159 mm was 180 sec.

EXAMPLE 3

A wear-resistant tube was fabricated with the use of a tube blank in the same way as outlined in Example 2, using a heat-absorbing material placed into the bore of the tube accommodated in the chill. The heat-absorbing material was a 1:1 mixture of quartz sand with blast-furnace slag taken in an amount of 10% by weight of the Thermit mixture. Hereafter the latter was applied to the layer of heat-absorbing material.

A tube 377 mm in diameter with walls 10 mm thick and measuring 500 mm in length was disposed in a chill so that a 7 mm layer of the heat-absorbing layer of powdered electrocorundum was placed between the tube and the walls of the chill. On setting the chill to spin centrifugally at 600 rpm, some 4.5 to 5 kg of a mixture of blast-furnace slag with quartz sand were placed on the inside surface of the tube, followed by a layer of Thermit powder taken in an amount of 40 kg. The Thermit was ignited in the usual way and in 22 to 25 sec. the entire amount of Thermit was on flame.

The burning of Thermit, i.e., the time during which the reactions of the reduction took place, lasted between 1.5 and 2 min, and the spinning of the chill with the tube continued for 3.5 to 4 min. After that, the chill was stopped and the tube withdrawn therefrom. The productive time for the tube of the above dimensions was 6.5 min. The thickness of the inside layer of metal deposited due to the reaction of the Thermit was 4 or 5 mm at a side, and that of the layer of monocorundum was 13 or 14 mm; the quality of surface finish of the monocorundum layer was close to that obtained after grinding. The entire heat-absorbing layer had molten and transformed into monocorundum.

What is claimed is:

1. A method for the fabrication of twin-layer tube products, comprising: centrifugally spinning a hollow cylindrical part in a horizontal plane; introducing a Thermit mixture to constitute the material of the tube product, and incorporating at least one metal oxide and a reducer into the bore of the cylindrical part during said spinning step; igniting and burning the mixture, thereby to obtain a liquid melt; again centrifugally spinning the hollow centrifugal part until the now liquid mixture is separated into a metal layer and a corundum layer, uniformly distributed over the inside surface of the cylindrical part; and crystallizing the materials so that a twin-layer tube product is obtained.

2. The method as defined in claim 1, wherein the mixture contains ferrous-ferric oxide ($Fe_2O_3$) has the metal oxide, and aluminum as the reducer for the oxide.

3. The method as defined in claim 1, wherein the mixture is that of ferrous-ferric oxide ($Fe_2O_3$) with manganese oxide (MnO) as the metal oxide, and an aluminum-magnesium alloy as the reducer.

4. The method as defined in claim 1, further comprising the step of introducing a heat-absorbing powdered material into the hollow cylindrical part during said first spinning step, and preparatory to said introducing step, uniformly distributing the heat-absorbing material over the inside surface of the cylindrical part during said second spinning step, to prevent direct contact of the hollow cylindrical part with products of the decomposing mixture.

5. The method as defined in claim 4, wherein the introduced heat-absorbing powdered material is electrocorundum.

6. The method as defined in claim 4, wherein the heat-absorbing powdered material is introduced in an amount assuring that the thickness of the layer of the formed material is at least equal to the thickness of the corundum layer formed during said second spinning step, and during said burning step.

7. The method as defined in claim 1, further comprising the step of applying a wear-resistant coating to the inside surface of a metal tube disposed in the hollow cylindrical part while the latter is submitted to said first spinning step, and said introducing step is performed with the mixture into the metal tube; and applying the metal and the corundum layers that form a twin-layer wear-resistant coating to the inside surface of the tube during said second spinning step, thereby melting the mixture.

8. The method as defined in claim 7, further comprising the step of applying a heat-absorbing powdered material to the inside surface of the metal tube disposed in the hollow cylindrical part during said first spinning step, and preparatory to said introducing step, the maximum weight ratio of the powdered material to the mixture being 1:10.

9. The method as defined in claim 8, wherein the heat-absorbing, powdered material is a 1:1 mixture of quartz sand and blast-furnace slag.

10. The method as defined in claim 7, further comprising the step of applying a heat-absorbing powdered material to the outside surface of the metal tube disposed in the hollow cylindrical part during said first spinning step, and preparatory to said introducing step into the metal tube.

11. The method as defined in claim 10, wherein the heat-absorbing material is powdered corundum.

12. The method as defined in claim 10, wherein the heat-absorbing powdered material is introduced in an amount assuring that the thickness of the layer of the formed material is at least equal to the thickness of the corundum layer formed during said second spinning step of the hollow cylindrical part, integrally with the metal tube, and during said burning step.

13. The method as defined in claim 1, further comprising the step of applying a heat absorbing material to at least one surface of the hollow cylindrical part.

* * * * *